United States Patent Office 3,389,998
Patented June 25, 1968

3,389,998
FERMENTATION PROCESS FOR PRODUCING ALCOHOLIC BEVERAGES FROM MICROALGAE
Jorgen Jorgensen, % Laboratorio de Investigacion, Leprocomio de Cabo Blanco, Maiquetia, Venezuela
No Drawing. Filed Jan. 17, 1967, Ser. No. 609,739
10 Claims. (Cl. 99—35)

ABSTRACT OF THE DISCLOSURE

A fermentation process utilizing mass-cultured microalge of the family Chlorophyceae to produce a wine-like alcoholic beverage. The process includes (1) the preparation of a slurry from concentrates of mass-cultured live microalgae, (2) the addition of sucrose to the slurry to constitute 8 to 12% by weight of the medium, (3) leaving the sweetened slurry in repose for a convenient period to allow the microalgae enzymes to produce a complex of organic acid flavoring factors from the sucrose (4) killing the live microalgae, diluting with water and clarifying the slurry, (5) adding additional sucrose to the culture medium to constitute a total of about 25 to 30 percent by weight of the liquid, (6) mixing the culture medium with a suitable strain of Saccharomyces yeast proliferating in a previously prepared identical culture medium, and (7) allowing the alcoholic fermentation to proceed in its natural course until terminated.

Summary

This invention relates to a process for fermenting sucrose to produce wine-like beverages. More particularly, this invention relates to a fermentation process for producing wine-like beverages which utilizes crude mass-cultured microalgae of the family Chlorophyceae. The necessity of using nutrient substances in the fermentation of various materials, in particular the well-known sugars, to obtain yeast growth and enzymatic activity has been well documented in the past. Each of these nutrient substances imparts a distinctive flavor to the beverage but environmental factors, problems of supply and ultimate cost limit their use in those areas having an abundance of refined sugar.

It has now been discovered that mass-cultured microalgae may be used in a fermentation process to produce an alcoholic beverage having a pleasant, wine-like taste. It is therefore an object of this invention to provide a readily available nutrient for use in the fermentation of sucrose.

It is a more fundamental object of this invention to produce a wine-like beverage by means of a yeast fermentation process conducted in the presence of a mass-cultured microalgae medium. According to this invention mass-cultured microalgae are used as nutrient materials for yeast resulting in fermentation of sucrose to produce a wine-like beverage. This beverage is obtained by first preparing a semi-solid microalgae paste which not only acts as a nutrient source but in addition enzymatically reacts with sucrose to produce organic acids as sources of flavoring factors which impart the pleasant taste to the liquid. This microalgae paste is obtained by preparing a slurry of live mass-cultured microalgae in water and adding sucrose to comprise 8 to 12% by weight of the medium. The temperature necessary during the process may vary from about 22° C. to 34° C. although room temperature is preferred. The sweetened slurry is left in respose a sufficient time in which to permit the enzymatic reaction of the live microalgae with the sucrose to produce complexes of organic acids which contribute favorably to the taste of the final alcoholic beverage. The time necessary for this reaction may vary between 5 to 12 hours, but preferably, 8 to 10 hours at 28° C. will be sufficient. The live microalgae are then killed by heat, preferably not water or steam heat, which stops the enzymatic reaction. The mass is then diluted and the slurry clarified by centrifugation or filtration. Thinning of the mass is necessary only when a sharples or similar type of supercentrifuge is used. If a nozzle type automatically discharging centrifuge is used, recyling of the liquid can be stopped when the slurry has acquired the proper consistency. A second phase of the process proceeds by adding additional sucrose to the culture medium to constitute a total of from about 25 to 30% by weight of the liquid. A suitable strain of Saccharomyces yeast proliferating in a previously-prepared identical culture medium is then mixed into the medium. The yeast culture which comprises about 10% by volume of the medium uses the nutrient factors in the microalgae culture and enzymatically reacts with the sucrose to produce fermentation. The fermentation is allowed to proceed in its natural course until terminated after which the yeast cells are removed by filtration of centrifugation. The resulting clarified liquid may be aged for from 6 to 18 months or more. Artificial colors or special flavors may be added to change the taste or appearance of the liquid.

The microalgae used in this invention are of the family Chlorophyceae, including Chlorella, Scenedesmus, Chlorococcum, etc. In their specially prepared form, decoctions of these substances serve as nutrients for yeast belonging to the genus Saccharomyces in its enzymatic reaction with sucrose to produce an alcoholic beverage of pleasant and distinctive taste. *Saccharomyces cerevisiae* and its related strains constitute preferred yeasts.

Description of the preferred embodiment

According to a specific but not limiting example of my invention the semi-solid dough mass of microalgae obtained by centrifugation was diluted with water to make a slurry containing about 10% of microalgae on the dry-basis.

A quantity of sucrose, equal to the dry weight of the algae in the slurry was added and the mixture, after having been stirred thoroughly, was left in repose for a period of 8–10 hours to allow the Microalgae enzymes to act upon the sugar. During this time the pH descended from about 7 to about 4.5 indicating a production of organic acids. The algae were then killed by hot water. The slurry was boiled for 30 minutes, cooled and clarified by sedimentation and filtration. Sufficient sucrose was added to bring the content up to 27%. A culture of *Saccharomyces cerevisiae* proliferating in a previously prepared identical culture medium was added while in full activity to constitute about 10% by volume of the liquid. At the atmospheric temperature of about 28° C. the alcoholic fermentation was completed in 10 days. The liquid was clarified by centrifugation and thereafter stored for maturation for approximately 18 months. The resulting beverage was light yellow in color, and contained about 12% alcohol. The taste was wine-like and slightly sweet. The beverage contained vitamins of the B-complex, as the yeast did not consume the entire vitamin content of the microalgal decoction. This was evidenced by the fact that the residue, after removal of the alcohol by distillation, sustained a second alcoholic fermentation when sucrose and yeast were added.

The microalgae used in this invention are mass-cultured by known methods involving the use of soluble commercial fertilizers as a source of nitrogen, phosphates, sulfates and mineral factors. The propagation of the culture proceeds in an aqueous medium with carbon dioxide highly diluted with air providing a source of carbon and a means for stirring.

In addition to having a pleasant taste, the vitamins contained in the beverage will be beneficial for their food value. The microalgae residue obtained from the centrifugation or filtration of the decoction can also be used as a source of carotene. If mixed with the yeast from the clarification of the beverage, an animal feedstuff can be obtained which will be superior to current residues from fermentations and/or distillations which do not contain carotene.

The principle, preferred embodiment, and modes of operation of the present invention have been described in the foregoing specification. However, it should be understood that the invention which is intended to be protected herein may be practiced otherwise than as described without department from the scope of the appended claims.

I claim:

1. A fermentation process for the production of a wine-like beverage from sucrose and mass-cultured microalgae which comprises:
    preparing a slurry of live mass-cultured microalgae in water, said microalgae present in amount sufficient to support an enzymatic reaction with sucrose,
    adding sucrose 8 to 12% by weight of the medium and and leaving the sweetened slurry in repose a sufficient time in which to permit the enzymatic reaction of the microalgae with the sucrose, killing the live microalgae, diluting with water and clarifying the slurry to form a nutrient culture medium,
    adding to said culture medium additional sucrose to constitute a total of about 25 to 30 percent by weight of the liquid,
    mixing said culture medium with a strain of Saccharomyces yeast proliferating in a previously-prepared identical culture medium to produce alcoholic fermentation, removing the yeast cells after completion of the fermentation, and
    aging the liquid.

2. A fermentation process according to claim 1 wherein the microalgae are left in repose with the sucrose for about 8 to 10 hours.

3. A fermentation process according to claim 1 wherein the live microalgae are killed by heating the slurry.

4. A fermentation process according to claim 1 wherein said microalgae are of the Chlorophyceae family.

5. A fermentation process according to claim 3 wherein said microalgae are complexes of the group consisting of Chlorella, Chlorococcum, and Scenedesmus.

6. A fermentation process according to claim 1 wherein said sucrose adding steps and said fermentation steps are carried out at about room temperature.

7. A fermentation process according to claim 5 wherein said steps are carried out at between about 22° C. and about 34° C.

8. A fermentation process according to claim 6 wherein said steps are carried out at about 28° C.

9. A fermentation process according to claim 1 wherein said yeast is *Saccharomyces cerevisiae*.

10. A fermentation process according to claim 3 wherein said slurry is heated by adding hot water.

References Cited
UNITED STATES PATENTS 3,066,025   11/1962   Simkin _____ 99—35

ALVIN E. TANENHOLTZ, *Primary Examiner.*

A. LOUIS MONACELL, *Examiner.*

D. M. NAFF, *Assistant Examiner.*

UNITED STATES PATENT OFFICE
CERTIFICATE OF CORRECTION

Patent No. 3,389,998                  June 25, 1968

Jorgen Jorgensen

It is certified that error appears in the above identified patent and that said Letters Patent are hereby corrected as shown below:

Column 2, line 4, for "not" read -- hot --; line 22, for "of" read -- or --.

Signed and sealed this 17th day of June 1969.

SEAL)
Attest:

Edward M. Fletcher, Jr.                  WILLIAM E. SCHUYLER, JR.
Attesting Officer                           Commissioner of Patents